United States Patent
Darnell et al.

(10) Patent No.: US 10,713,963 B2
(45) Date of Patent: Jul. 14, 2020

(54) MANAGING LIFELONG LEARNER EVENTS ON A BLOCKCHAIN

(71) Applicant: INTERNATIONAL BUSINESS MACHINES CORPORATION, Armonk, NY (US)

(72) Inventors: Shelby Solomon Darnell, Yorktown Heights, NY (US); Jonathan Lenchner, North Salem, NY (US); Daby M. Sow, Croton on Hudson, NY (US); Charity Wayua, Nairobi (KE); Komminist Weldemariam, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 273 days.

(21) Appl. No.: 15/605,126

(22) Filed: May 25, 2017

(65) Prior Publication Data
US 2018/0342171 A1   Nov. 29, 2018

(51) Int. Cl.
| G09B 5/02 | (2006.01) |
| G09B 7/00 | (2006.01) |
| G09B 7/02 | (2006.01) |
| G06Q 20/06 | (2012.01) |
| H04L 9/32 | (2006.01) |

(52) U.S. Cl.
CPC ............. *G09B 5/02* (2013.01); *G06Q 20/065* (2013.01); *G09B 7/00* (2013.01); *G09B 7/02* (2013.01); *H04L 9/3236* (2013.01); *H04L 9/3297* (2013.01); *G06Q 2220/00* (2013.01); *H04L 2209/38* (2013.01)

(58) Field of Classification Search
CPC ...... H04L 9/3247; H04L 2209/56; H04L 9/30
See application file for complete search history.

(56) References Cited

U.S. PATENT DOCUMENTS

| 8,326,838 B2 | 12/2012 | Gaitas |
| 10,355,869 B2* | 7/2019 | Bisti .................. H04L 9/3247 |
| 2007/0098364 A1 | 5/2007 | Toennis et al. |
| 2008/0154960 A1 | 6/2008 | Francisco |
| 2009/0197234 A1 | 8/2009 | Creamer et al. |

(Continued)

FOREIGN PATENT DOCUMENTS

| CN | 202044743 | 11/2011 |
| WO | WO 2015/047424 | 4/2015 |
| WO | WO 2015/085393 | 6/2015 |

*Primary Examiner* — Robert J Utama
(74) *Attorney, Agent, or Firm* — F. Chau & Associates, LLC

(57) ABSTRACT

A method of managing lifelong learner events on a blockchain includes detecting an event related to a learner using a blockchain-enabled digital learning system, determining a concern/risk level of the learner by performing a risk assessment, determining parameters to generate a transaction related the learner's event based on the parameters and the concern/risk level, determining the values of the parameters by measuring the value or importance of the event and its associated metadata and documents, generating a list of transactions corresponding to the parameters, and validating the transactions using validating distributed peer-to-peer devices that run one or more chaincodes related to the management of the lifelong learner events.

14 Claims, 6 Drawing Sheets

(56) References Cited

U.S. PATENT DOCUMENTS

| | | |
|---|---|---|
| 2011/0314094 A1 | 12/2011 | De Oliveira Antunes |
| 2012/0094265 A1 | 4/2012 | Boler |
| 2013/0330704 A1 | 12/2013 | Creamer et al. |
| 2015/0332283 A1 | 11/2015 | Witchey |
| 2017/0214675 A1* | 7/2017 | Johnsrud ................ H04L 63/08 |
| 2017/0243177 A1* | 8/2017 | Johnsrud ............. G06Q 20/389 |
| 2017/0323392 A1* | 11/2017 | Kasper .................. G06Q 40/12 |
| 2017/0346637 A1* | 11/2017 | Zhang .................. H04L 9/0643 |
| 2018/0240112 A1* | 8/2018 | Castinado .......... G06Q 20/3829 |
| 2018/0253702 A1* | 9/2018 | Dowding .............. G06Q 20/06 |

\* cited by examiner

MANAGING LIFELONG LEARNER EVENTS ON A BLOCKCHAIN

BACKGROUND

Technical Field

Embodiments of the disclosure are directed to improving learning by maintaining valid and tamper-proof educational records for teachers and students to monitor learning outcomes. The records include all elements or events associated with teacher and student academic lifecycles. These lifecycle events range from student and teacher attendance, how a student approaches learning, including interactions with content, to tardiness, in-class exams and homework, student (and teacher) discipline, etc.

Discussion of the Related Art

In the developing world, the adoption of technology to manage data will lead to cost effectiveness, efficiency, and the seamless integration of an education management information system (EMIS). There are a wide variety of technologies that include, but are not limited to, mobile phones, tablets, laptops, desktops and broadband connectivity that can be used in data collection, processing, analysis and dissemination of educational data. Furthermore, educational data informs policy, planning and management of education with the aim of improving the quality, access and the relevance of education.

However, in many cases there is insufficient data on teachers and students to support personalized education. Personalized education is an approach to improving the learning experience for both teachers and students by fostering engaged teacher-student experiences. It requires an understanding of the learning environment and a detailed understanding of the student's learning history and their performance challenges. Outside of exam results, there is insufficient data to help support widespread teacher-student engagement. Note that currently existing adaptive or personalized education systems consolidate data from disparate sources to improve learning outcomes and student success. This poses data security and privacy issues while managing student records.

A student record management system can be used to track lifelong events of a student in which the record is held in a database, such as a "School Information Hub", by a central "owner." Currently, school record management systems keep track of events related to the student record made by a digital learning environment or stakeholders, who still require participation of internal and external actors, by "checking in the record" to the database.

Previous approaches have focused either on centralized or decentralized models of managing school records, learning and teaching activities, etc. With a centralized model, the owner of the school records may be trusted to manage operations on records and the owner of the records also owns the rules. Any operation on the records is trusted by trusting the rules to be appropriate. But, such a model can easily allow for a single point of failure in trust. With a purely decentralized model, trust is disseminated among the many. Such a model of tracking and managing school systems has failed in many developing countries due to its inability to block corruption at various levels. However, a decentralized model with consensuses, using an identity authority, allows one to rely on trusted services and non-repudiation, and by using a blockchain, immutable operations/transactions can be ensured.

This is paradoxical, in that without a central database, records may be modified and altered by different stakeholders in different subjects as the user, e.g., a learner, may be enrolled in more than one course, a user may switch learning modes from classroom model to outside classroom mode to tutoring mode, and different stakeholders may share a record with each other. In this way, a student record can "evolve" independently of the primary central database, and alteration of records is possible.

Recently a number of initiatives are proposing the use of blockchain technology for education. The use of a blockchain for lifelong record management ensures that records remain consistent and can never be maliciously modified by any individual. Instead, the alteration of student records can be verified against a particularly useful instance of the student record by obtaining from the blockchain a historical block identifier of a student record historical blockchain representative of all historical student events that have been compiled onto the student's record. This greatly improves the accountability or transparency (electronic audit trails) while guaranteeing data security and privacy by design.

However, all current blockchain-based-technologies in education focus on educational testing, academic certification and the authentication of degrees. They do not focus on the day to day running of a school and the myriad of events that affect a student's or teacher's academic record, such as student interactions with learning materials, such as learner interactions with content presented on a computer device, including start, pause, stop, fast forward, rewind, zoom-in, zoom-out, hover, expressed sentiments such as happy, sad, bored, etc all tagged with timestamp and/or location, student and teacher attendance, tardiness, in-class exams and homework, student (and teacher) discipline, etc. Typically, these events and data are used by intelligent applications for adaptive and personalized learning to infer learner engagement, understanding and progress or lack thereof, for example, to infer content effectiveness and popularity, and for example, to infer learner sentiment, context and affective states.

SUMMARY

Embodiments of the disclosure are directed to the management of student and teacher lifelong records using blockchain technology to securely track, maintain and manage these records. Transactions associated with the record are compiled into a chain of record transaction blocks. The chain can be considered a chronicle of record path through time. When a transaction occurs, one or more corresponding record parameters of learning events, such as completion of learning content, completion of quiz/assessment, updating knowledge model, updating mastery level, etc., are sent to one or more validation modules. The modules establish a validity of the transaction and generate a new block. Once the new block has been calculated it can be appended to the historic learner lifelong events blockchain.

According to an embodiment of the disclosure, there is provided a method of managing lifelong learner events on a blockchain, including detecting an event related to a learner using a blockchain-enabled digital learning system, determining a concern/risk level of the learner by performing a risk assessment, determining parameters to generate a transaction related the learner's event based on the parameters and the concern/risk level, determining the values of the parameters by measuring the value or importance of the event and its associated metadata and documents, generating a list of transactions corresponding to the parameters, and validating the transactions using validating distributed peer-to-peer devices that run one or more chaincodes related to the management of the lifelong learner events.

According to a further embodiment of the disclosure, the method includes, when the transaction validation succeeds, creating a new block and updating the blockchain based on the new block, and compiling the transactions associated with the learner's computing device into a chain of the learner's event blocks.

According to a further embodiment of the disclosure, events include one or more of learner activities, application events, and sensor events.

According to a further embodiment of the disclosure, the risk assessment is based on the learner's observed behavior, predicted learner characteristics, and context.

According to a further embodiment of the disclosure, the method includes performing one or more off-blockchain processing and analytics processes, when off-blockchain processing is needed.

According to a further embodiment of the disclosure, validating the transactions includes receiving validity requirements for events on the blockchain, obtaining a validation token indicative of the validity of the learner event, and computing a chaincode block for the transaction against the validation requirements.

According to a further embodiment of the disclosure, the method includes automatically changing a rate of updating the distributed repository based on the risk assessment.

According to a further embodiment of the disclosure, the method includes rewarding a learner with a cryptocurrency based on the learner's historic performance, engagement and overall progression, and recording the reward in the distributed repository for the learner.

According to another embodiment of the disclosure, there is provided an apparatus for managing lifelong learner events on a blockchain that includes a distributed repository to securely store and maintain learner records, an event framework that collects and aggregates learning activities or events of a user related to content and assessment by a learning application or cognitive event using in-built in mobile sensors, a transaction detector that detects the collection of new content based on the output of the event framework, and a parameter processor that compiles the new content into a new learner record and triggers an appending of a record transaction associated with the user into the distributed repository, based on the new content detected by the transaction detector.

According to a further embodiment of the disclosure, the distributed repository is a blockchain.

According to a further embodiment of the disclosure, record transactions associated with a learner record include one or more of updating student performance data, updating user profiles, recording a learner's affective or cognitive state, an interaction event associated with learner's learning activity, posting comments, feedback or questions, and submitting an assessment item.

According to a further embodiment of the disclosure, triggering the appending of transactions into the distributed repository is further based on one or more customizable parameters, where the customizable parameters include biometric information of a learner through the life of the learner record or for a period of time, activities of a learner through the life of the learner record or for a period of time, one or more actions of a learner with content presented by a learning technology environment on computer device, assessment or quiz specific events, and aggregate usage data of content, location of content being skipped, and rewinding a content location.

According to a further embodiment of the disclosure, the apparatus includes a button on a GUI to activate the appending of a record transaction into the distributed repository.

According to a further embodiment of the disclosure, the distributed repository includes a chronicle of a user's biometric information through the life of the learner record, or for a predetermined period of time, a chronicle of learner activities through the life of the learning process, or for a predetermined period of time, one or more learner interactions with content presented by a learning technology environment on a computer device, and a history of contents viewed, where the learner interactions include one or more of a start, pause, stop, fast forward, rewind, zoom-in, zoom-out, and hover, assessment or quiz specific events and data, including one or more of quizzes or assessments taken, time spent per question, number of responses, number of attempts, a timestamp, grade, skipped content, and an attention assessment, an aggregate content usage data, location of skipped content, location of repeated content, affective or attentive states of a learner along with timestamp and location, where the affective or attentive states include whether the learner is happy, sad, bored, where the affective or attentive states are self-reported or detected by an intelligent means, ratings of skills, knowledge, progressions, attendance, and behavior, learner context information from sensor events through the life of the learner record, where sensors includes one or more of an accelerometer, a microphone, a light sensor, and a GPS, application activity data, and one or more of formative assessment data, behavior data, location data of content usage, and other application activities.

According to another embodiment of the disclosure, there is provided a non-transitory program storage device readable by a computer, tangibly embodying a program of instructions executed by the computer to perform the method steps for managing lifelong learner events on a blockchain.

DETAILED DESCRIPTION OF EXEMPLARY EMBODIMENTS

Figure 1:
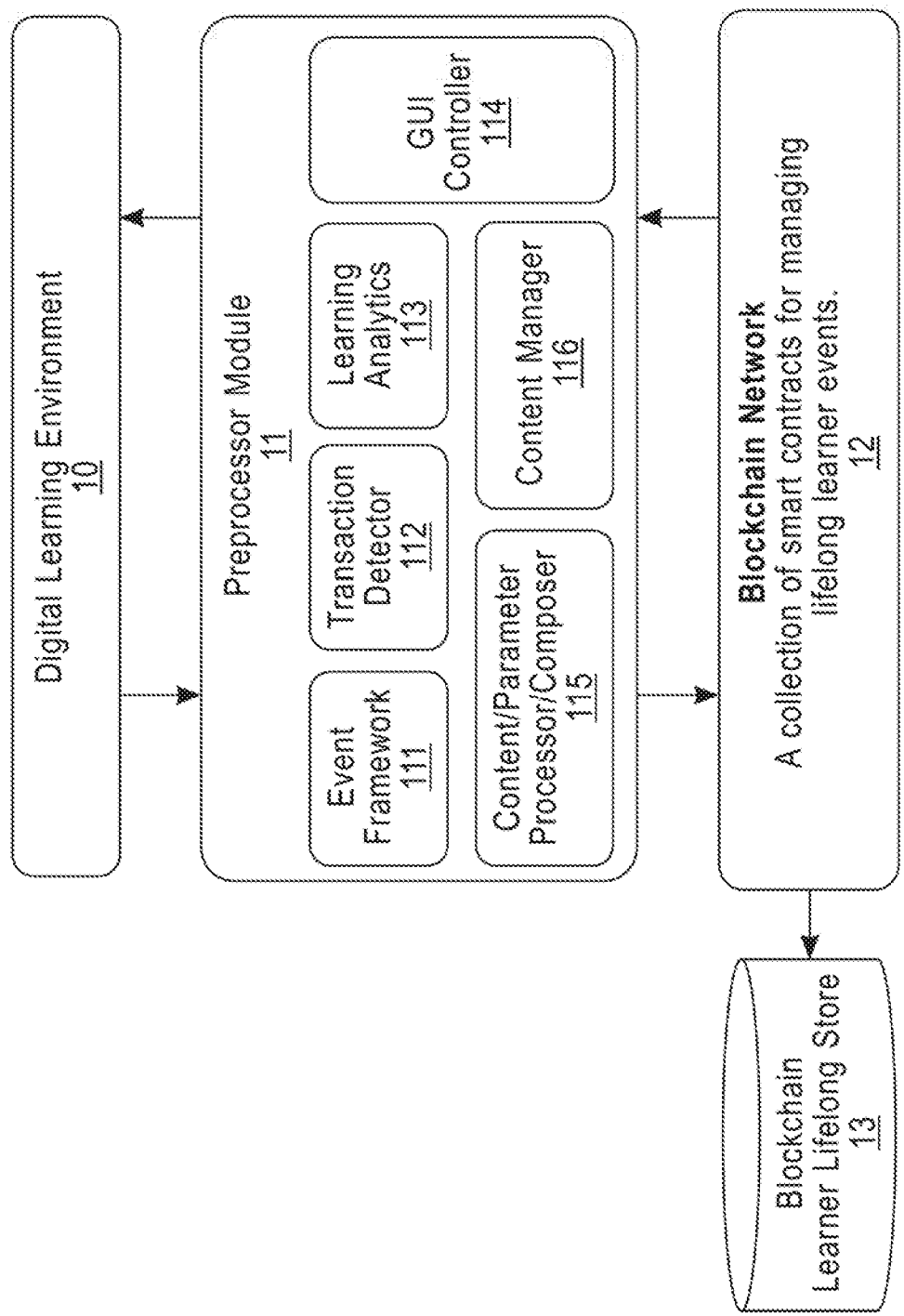
FIG. 1 is a block diagram of an exemplary system according to embodiments of the disclosure.

Exemplary embodiments of the disclosure as described herein generally provide systems and methods for the management of learner lifelong records. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Embodiments of the disclosure use blockchain technology to securely track, maintain and manage lifelong learner records, where a learner can be either a student or a teacher. Transactions associated with the record are compiled into a chain of record transaction blocks. The chain can be considered a chronicle of record path through time. When a transaction occurs, one or more corresponding record parameters of learning events, such as completion of learning content, completion of quiz/assessment, updating knowledge model, updating mastery level, etc, are sent to one or more validation modules. The modules establish a validity of the transaction and generate a new block. Once the new block has been calculated it can be appended to the historic learner lifelong events blockchain.

According to embodiments, a transaction related to a learner record includes events such as recording, updating or uploading learner performance, updating a user profile, logging a learner's affective/cognitive state of the learner, and interaction events associated with learner learning activity, posting a comment, feedback or question, submitting or completing an assessment item, etc. Updating a user profile includes, for example, knowledge model, skill model, user preference/style, etc. Learner learning activities include content item interactions, assessment/quiz item interactions, content searching, e.g., in adaptive learning platforms such as Cognitive Learning Companion™ (CLC), and the mEduPAL™ application.

The Cognitive Learning Companion™ (CLC), and the mEduPAL™ have been developed by IBM Research to connect multiple modes of learning, enabled through mobile platforms and delivered via the cloud and support the collection, storage and processing of dynamic user interactions from systems like CLC, respectively.

An event can be one or more actions of a learner, such as: interaction with content presented by a learning technology environment on a computing device, such as start, pause, stop, fast forward, rewind, zoom-in, zoom-out, hover, history of contents viewed, etc.; assessment/quiz specific events such as quiz/assessment taken, time spent per question, number of responses, number of attempts, etc., along with a timestamp, gradebook data, skipping content, lack of attention on content, aggregate usage data of content, location of content being skipped, rewind content location; a learner's affective or attention states, either self-reported or detected by intelligent means such as camera data, such as happy, sad, bored, along with timestamp and/or location, such as in classroom, outside classroom, as captured by an instrumented environment; events related to ratings of skills, knowledge, progressions, attendance, behavior, etc., learner contextual information from sensor events. An event conducted with respect to an instance of the learner record refers to the compilation of the all of the above events onto a particular learner record on a blockchain.

According to embodiments, any transaction related to a learner record should include the universally unique identifier (UUID) of the learner. Various customized parameters related to various records, such as learner, teacher, resource, etc., records, can be added to the growing block, including:

A chronicle of biometric information of a user through the "life" of the learner record, or for a period of time T;
A chronicle of activities of a learner through the "life" of the learning process, or for a period of time T;
One or more actions of a learner interaction with content presented by a learning technology environment on a computer device, such as a mobile device, a tablet, an iPad, a desktop, etc., such as start, pause, stop, fast forward, rewind, zoom-in, zoom-out, hover, history of contents viewed, etc.;
Assessment/quiz specific events such as quiz/assessment taken, time spent per question, number of responses, number of attempts, etc., along with a timestamp, Gradebook data, skipping content, lack of "attention" on content, etc.;
Aggregate usage data of content, location of content being skipped, rewind a content location;
One or more affective or attention states of a learner, either self-reported or detected by intelligent means such as camera data, such as happy, sad, bored, along with timestamp and/or location, e.g. in classroom or outside classroom context, as captured by instrumented environment;
The learner record's various entities though life, such as stored as IDs' of entities such as course IDs, assessment ID, school ID, etc.;
Ratings of skills, knowledge, progressions, attendance, behavior, etc.;
One or more learner context information from sensor events such as an accelerometer, a microphone, a light sensor, a GPS etc., through the life of the learning progression;
One or more application activity data; and
One or more of formative assessment data, behavior data, location data of content usage, other application activity, etc.

According to embodiments, one or more of these parameters can be securely stored and managed in a growing block. Embodiments can implement various utilities for tracking, storing and managing records based on events related to learning activities. Further embodiments can intelligently sense and process learner's interaction data, such as learning interaction data on devices in which the management of sensed event data include progressive event summarizations and similarity-based reconstructions from historical logs on the blockchain.

Learner events are produced by the use of learning technologies, and these events can also be stored and managed on a blockchain. For example, upon completion of learning content or completion of quiz assessment, a system according to an embodiment may decide to include events that have been captured or sensed during the user's interaction with learning technology system and persist these events on the learner's historic record blockchain. The decision to include one or more parameters, including metadata, in the blockchain block can be determined in real-time based on an arbitrary context and on the importance of the collected parameter, such as topic or concept of the content.

FIG. 1 is a block diagram of an exemplary system according to embodiments of the disclosure. Referring now to the figure, a system according to embodiments includes a learner record that includes one or more of a learner profile, learner attendance, etc., a preprocessor module 11 in communication with a digital learning environment 10, and also in communication with a blockchain network 12. The blockchain network 12 is connected to a blockchain learner lifelong store 13 that serves as a database for storing the chaincode and records of the blockchain network 12. The learner record is stored on the blockchain lifelong learner store 13. A preprocessor according to embodiments of the disclosure can determine the interesting/novel quantities of events related to learning being stored in the block, determines how and when to send the content to the block, e.g.

via a GUI interface to a learner or triggered by automated means; determines the rate of sending information to the block, which, for example, may speed up when useful, such as when risk is high and there is a need to store more information. The preprocessor module 11 further includes an event framework 111, a transaction detector 112, a learning analytics module 113, a GUI controller 114, a content/parameter processor/composer 115, and a content manager 116. According to embodiments, risk parameters are often stored in the block. A preprocessor according to an embodiment can change what is actually stored in the block, based on predetermined criteria. For example, if risk is low, event A can be stored in the block, but when risk is high, more of event B is stored in the block.

An event framework 111 according to an embodiment is an adaptive module that instruments, collects and aggregates learning activities or events of a user/learner related to content and assessment by a learning application, affective or cognitive event using in-built in mobile sensors, etc. An exemplary, non-limiting event framework is described in U.S. Patent Publication No. US2017/0078169, the contents of which are herein incorporated by reference in their entirety. A transaction detector 112 according to an embodiment is a module that detects the addition of content to the record based on the output of the event framework, such as user interaction events captured by a digital learning environment, learning progression for a period of time T, etc. A parameter processor and composer 115 is a module that compiles contents and parameters and then triggers the appending of record transactions associated with a learner into the chain of a historic learner's record blockchain, based on new content detected by the transaction detector 112. A learning analytics module 113 is a collection of various learning analytics models trained using dynamic data captured from event framework and static data, such as historical/longitudinal learner data.

The content manager 116 manages learning content on the learner device, such as multimedia content such as audio, video, or text content, and the GUI controller 114 controls and maintains the relevant UI elements per the personalized needs of each learner.

A learner lifelong record according to an embodiment is managed and stored on the ledger, which is stored in the blockchain learner lifelong store 13. The preprocessor module 11 collects, using the event framework 111, and prepares, customizes and/or generates transactions using the transaction detector 12 and data associated with a learner, such as data related to behavioral and learning events, user profile information such as knowledge model, skill model, user preference/style, etc, affective/cognitive state of the learner, interaction events associated with activities such as content item interaction, assessment/quiz item interaction, content searching, posting a comment, feedback or question, submitting or completing an assessment item, etc. The collection and instrumentation of learner events is performed by the event framework 111. These transactions and data are then transmitted to the blockchain to be stored and securely managed on the ledger.

Figure 2:
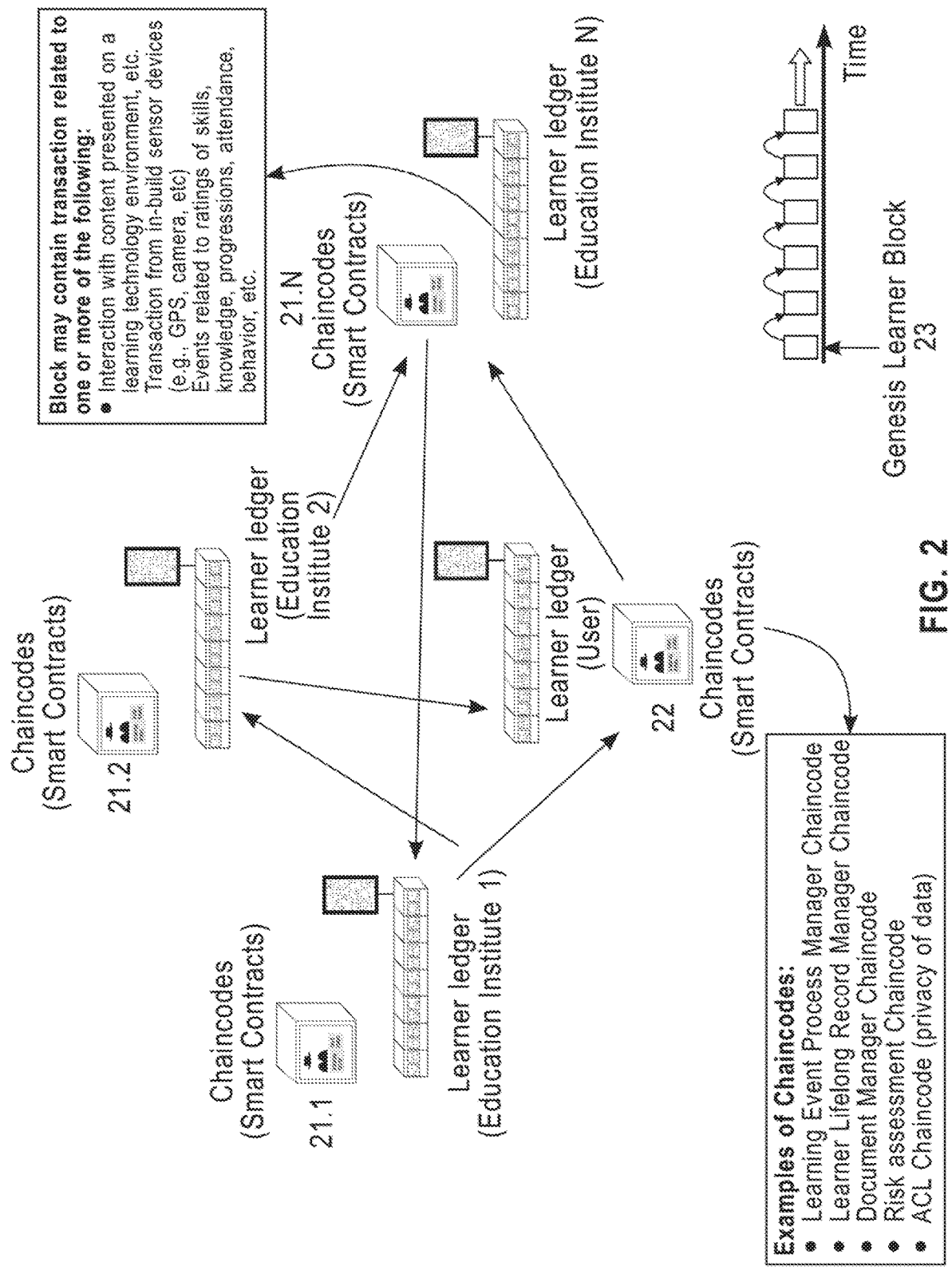
FIG. 2 depicts an exemplary blockchain network for a user according to an embodiment of the disclosure.

FIG. 2 depicts an exemplary blockchain network for a user according to an embodiment. A blockchain network is a collection of smart contracts that can manage lifelong learner events. Referring now to the figure, a blockchain network according to embodiments includes a plurality of learner nodes 21.1, 21.2, . . . , 21.N, one for each educational institution associated with the user, and a user node 22. Each node includes chaincodes and an associated ledger. Item 23 depicts a genesis learner block of a ledger, which is the very first block in a ledger chain. The ledger chain is a linked list, with each block pointing to its successor. Examples of chaincodes include learning event process manager chaincode, learner lifelong record manager chaincode, document manager chaincode, risk assessment chaincode, and an access control (ACL) chaincode that controls privileges and access rights of a school record. These chaincodes are deployed at each node of the blockchain network to manage lifelong learner events. According to embodiments, all functionalities and services described above are governed by the necessary smart contracts, such as process chaincode for ensuring the corresponding processes are followed and agreed up on by all the nodes, access control chaincode that defines and manages access rights, i.e., who can access, what can be accesses, how data is accessed, granting/revoking access rights, etc., for learner data. Each learner ledger block also includes transaction records related to one or more of interaction with content presented by a learning technology environment, data from built-in sensors, such as GPS, a camera, etc., or events related to the rating of skill, knowledge, progression, attendance, behavior, etc.

Figure 3A:
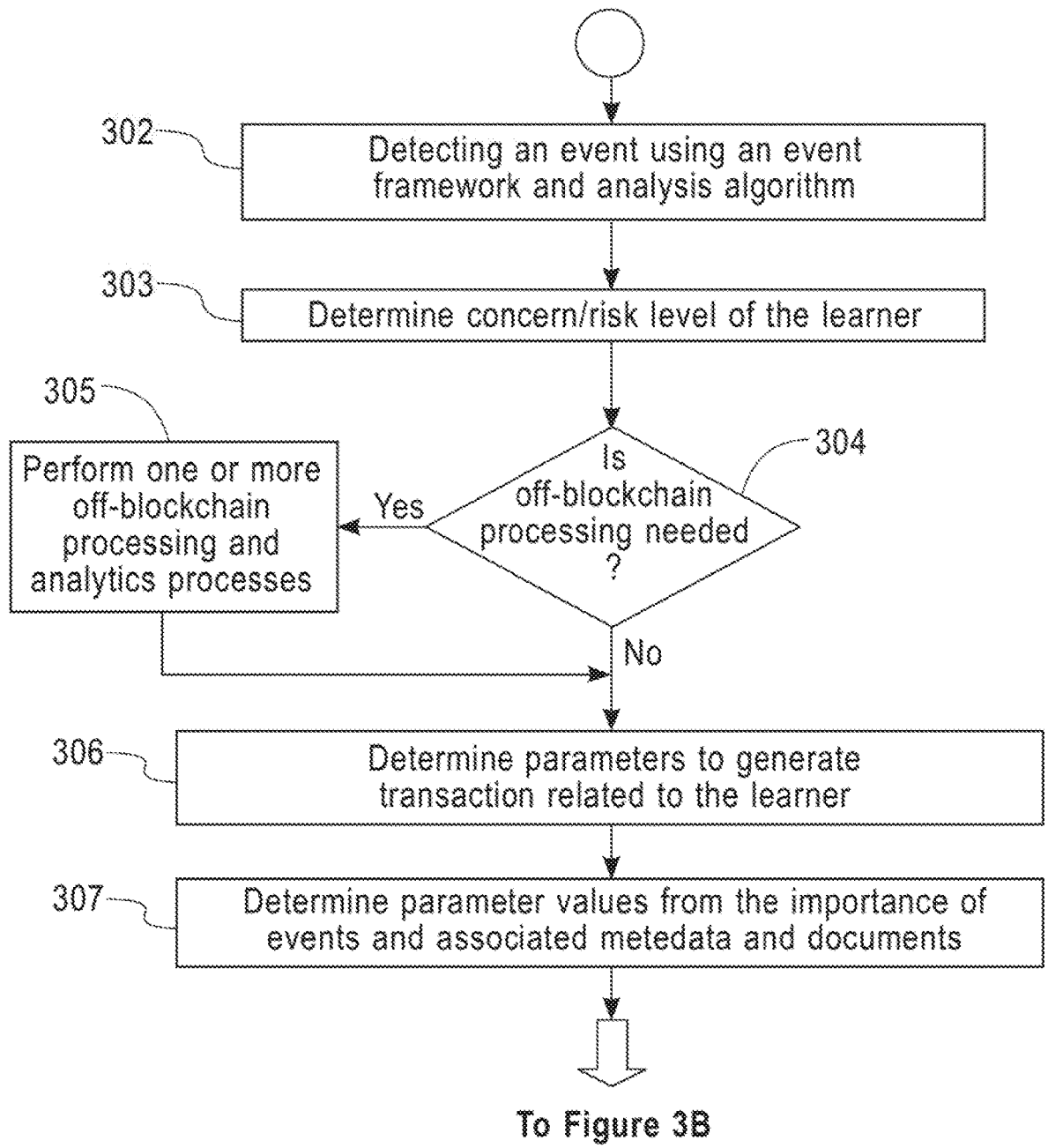
FIGS. 3A-B is a flowchart of a workflow according to an embodiment of the disclosure.
Figure 3B:
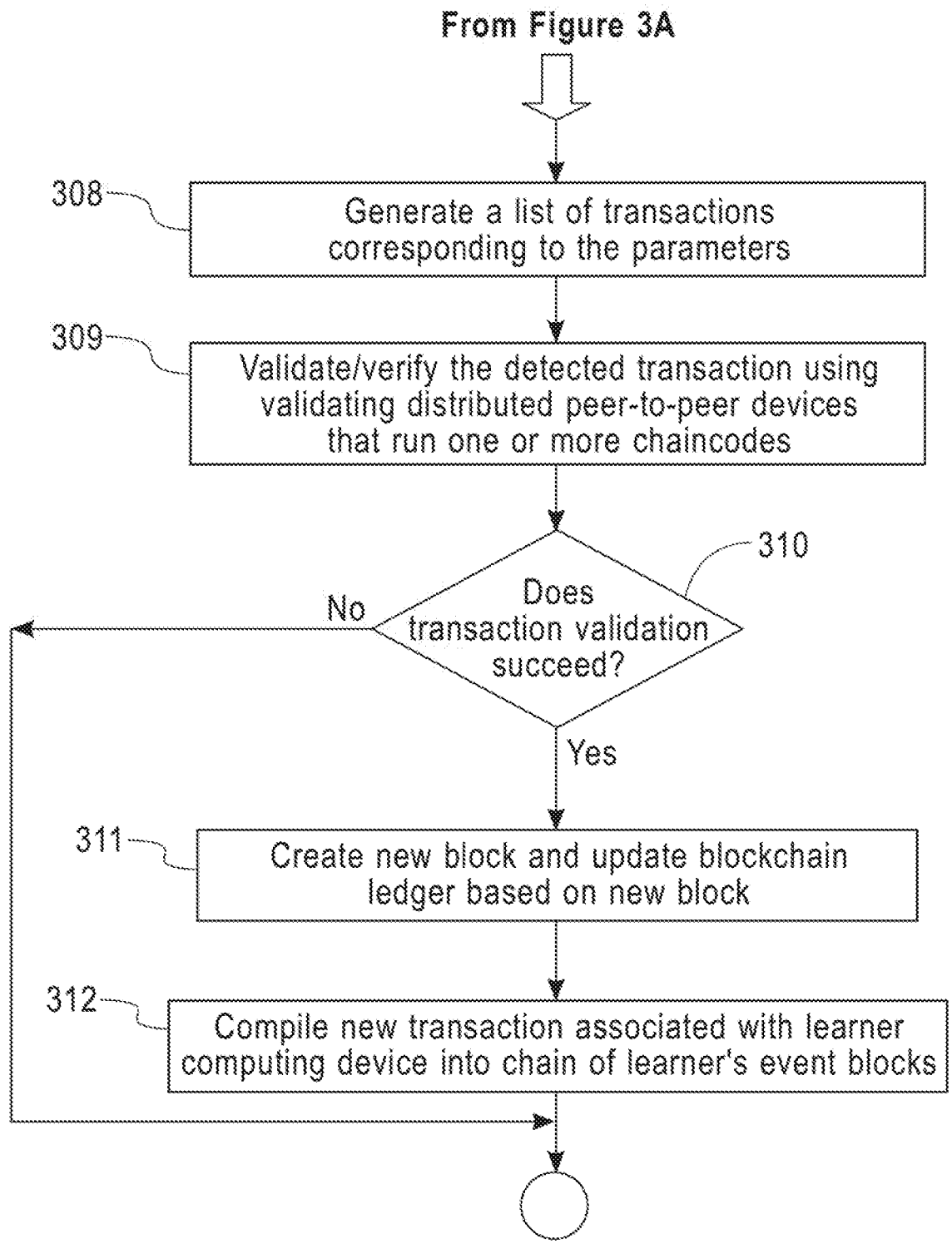

A flowchart of a workflow according to an embodiment of the disclosure is shown in FIGS. 3A-3B. Referring now to FIG. 3A, a workflow begins at step 302 when a blockchain-enabled digital learning system according to an embodiment with a plug-and-play event framework such as that disclosed in U.S. Patent Publication No. US2017/0078169 that is monitoring events detects an event related to a learner, such as a learner activity, an application event, a sensor event, etc. At step 303, a concern/risk level of the learner is determined by performing risk assessment related to learner's observed behavior, predicted learner characteristics, and context concerns, etc. At step 304, the event framework determines whether off-blockchain processing are needed, based on the context of the transaction, and if needed, the event framework performs, at step 305, one or more off-blockchain processing and analytics processes, such as metadata extraction, fraud detection, etc. The event framework determines, at step 306, parameters to generate a transaction related to the learner based on the parameters and the concern/risk level, and at step 307, determines the values of the parameters by measuring the values or importance of events and their associated metadata and documents. These parameters are related to learner interactions, engagement, performance, sentiments, etc., and the learner's affective and cognitive states. Parameter values include pause, start, stop, fast forward, rewind, zoom-in, zoom-out, click, hover, etc. Transactions related to a learner event include recording, updating, and uploading user profiles, where the profile includes a knowledge model, a skill model, user preferences and styles, etc., recording a learner's affective or cognitive state based on events detected from mobile sensors, interaction events associated with activity such as content item interaction, assessment/quiz item interaction, content searching, posting a comment, feedback or question, submitting or completing an assessment item, learned behavioral and learning events, etc.

Referring now to FIG. 3B, a list of transactions corresponding to the parameters is generated at step 308, which creates an auditable trail to the extent possible. At step 309, the transactions are validated using validating distributed peer-to-peer devices that run one or more chaincodes. The validation includes (1) receiving validity requirements for the events on the blockchain; (2) obtaining a validation token indicative of the validity of the learner events; and (3) computing a chaincode block for the transaction against the validation requirements. At step 310, it is determined whether the transaction validation succeeded. If, at step 311, the transaction validation succeeds, a new block is created and the blockchain ledger is updated based on the new block, and the transactions associated with the learner's computing device are compiled into a chain of the learner's event blocks at step 312. If the transaction validation fails, the transaction process terminates.

In some embodiments, the rate of addition to the blockchain can automatically change, but generally increases, based on a risk assessment or forecast, in which the risk assessment includes predicting the learner's risk of failure on a particular topic/course, detecting high disengagement based on content interaction, historic behavioral or affective patterns, etc. The rate may change in a setting where some kind of risk or forecast suggests that a learner is at risk of failing a course, etc., based on, e.g., the performance of a learner is dropping as inferred from past assessments. This may also depend on the dependence of the learning topic or concept on content being browsed, e.g., topics in which the learner struggled on the prerequisites.

In other embodiments, the rate of addition to the blockchain can automatically change, but again, generally increases, the more a learner seems to exceeding the norms or averages for the particular course. Such learners may be at risk for disengagement due to boredom if they do not receive targeted, more advanced, material, and also may be targets for personalized education when the additional data will help inform more one-on-one teacher-learner interactions.

In further embodiments, a GUI button can be used to control what and when something is stored in the block, or these kinds of additions to the block can be automated. For example, when the button on a digital personalized learning system is selected or automatically enabled, a block can be written to the blockchain, along with a Content or Resource ID, a Device ID, a content dependency graph (CDG) ID, etc. Note that as disclosed above, any transaction related to the user record includes the UUID of the user.

A blockchain based system and method according to embodiments of the disclosure can facilitate customized utilities by using prior art in learning science such as learner behavior analysis, learner retention analytics, personalized and aggregated root cause analysis for learner performance, etc., and APIs for learner data insights with data push/pull, analytics functions, etc. Thus, any (authorized) application level analytics service for personalized intervention can use a historic learner blockchain according to an embodiment of the disclosure.

Analytics functions include content-level interactions analysis for the individual learner to understand how a learner is engaged with learning resources, such as a learner's performance on various (sub-) strands of tests quizzes and assessments with respect to skills, knowledge and understanding, with results accessible to the classroom teacher, head-teacher and/or administration; item-level analysis for the individual learner, to allow teachers to analyze whether the learner misses the same quiz question items, and then to adjust intervention strategies; and analytics on emotion and context of a learner's social-learning-interactions behaviors to understand the learner's mood, affect, and/or cognitive states, and thus to adjust their intervention strategies by applying various intervention strategies.

In addition, a blockchain based system and method according to embodiments of the disclosure can enable the customization of personalized education services with advanced personalized insights and experiences, personalized tutoring, learning experience management, certifications and credential management, performance and retention risk analysis, etc.

In addition, systems according to embodiments can integrate the use of bitcoin or other cryptocurrency technologies to reward learners based on their historic performance, engagement and overall progression. Coins of the cryptocurrency can be rewarded and stored in the learner's historic lifelong record blockchain. The historic rewarding may be used for other purposes, such as requesting higher education loans, demonstrating job achievement on interviews, etc.

A blockchain based system and method according to embodiments of the disclosure can be used to facilitate any of:

Lock In Attribution: Embodiments can help create a permanent and unbreakable link between the learner (or data owner) and the record, and that link—the record of ownership—can be forever verified and tracked.

Secure Sharing: Embodiments can help securely share one's digital content with others. Sharing behavior or lifelong gains in skill is made as easy as sharing or copying a piece of data with blockchain based consent management logic.

Improvement Visibility: Embodiments can sometimes help trace when and how learning or performance improves. Embodiments can show how content, topics, levels of competence, or learning routine have appeared and grown over time.

Certificate of Authenticity: Each logged behavioral, learning, etc., event may come with a certificate of authenticity (COA), a built in unique cryptographic ID, and complete ownership history. The COA can be verified anytime and printed out.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
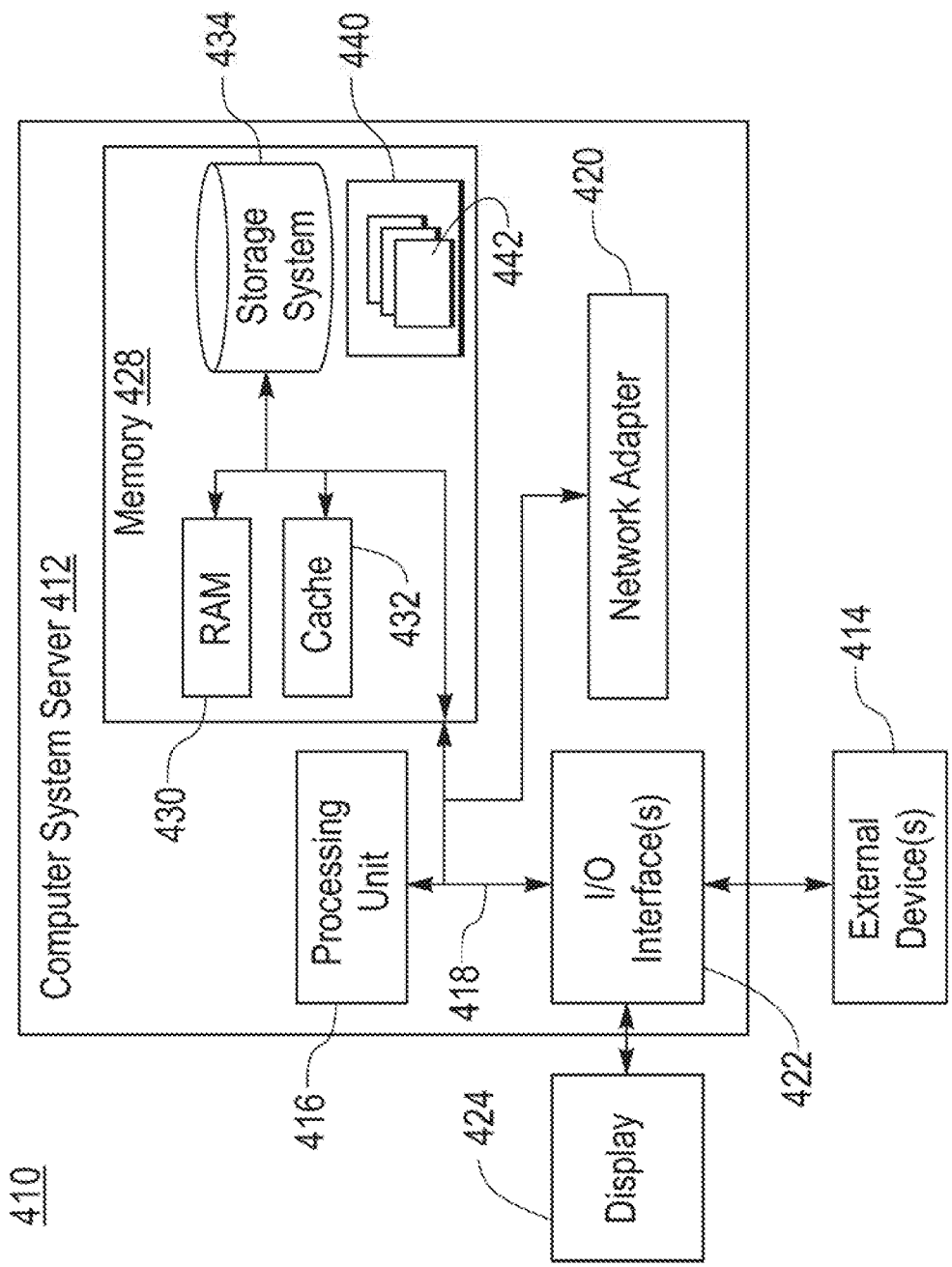
FIG. 4 is a schematic of an exemplary cloud computing node that implements an embodiment of the disclosure.

Referring now to FIG. 4, a schematic of an example of a cloud computing node is shown. Cloud computing node 410 is only one example of a suitable cloud computing node and is not intended to suggest any limitation as to the scope of use or functionality of embodiments of the disclosure described herein. Regardless, cloud computing node 410 is capable of being implemented and/or performing any of the functionality set forth herein above.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the disclosure as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
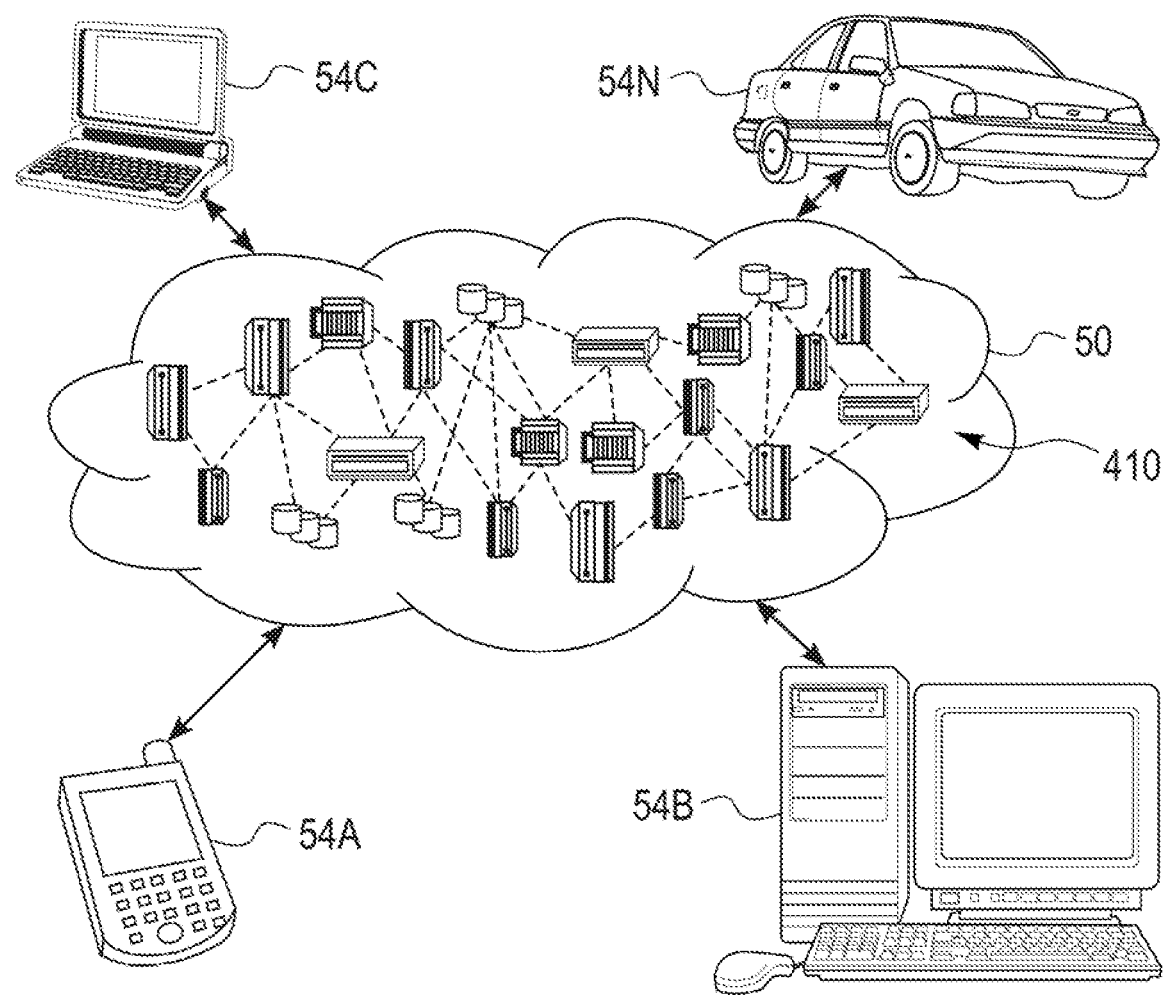
FIG. 5 shows an exemplary cloud computing environment according to embodiments of the disclosure.

Referring now to FIG. 5, illustrative cloud computing environment 50 is depicted. As shown, cloud computing environment 50 comprises one or more cloud computing nodes 400 with which local computing devices used by cloud consumers, such as, for example, personal digital assistant (PDA) or cellular telephone 54A, desktop computer 54B, laptop computer 54C, and/or automobile computer system 54N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 900 and cloud computing environment 50 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method of managing lifelong learner events on a blockchain, comprising the steps of:
   detecting an event related to a learner using a blockchain-enabled digital learning system;
   determining a risk level of failing a course of the learner by performing a risk assessment;
   determining parameters based on risk level;
   determining values of the parameters from the event related to the learner and metadata and documents associated with the event related to the learner, wherein the values of the parameters include pause, start, stop, fast forward, rewind, zoom-in, zoom-out, click, or hover;
   generating a list of transactions related to the event related to the learner and corresponding to the parameters; and
   validating each transaction in the list of transactions using validating distributed peer-to-peer devices that run one or more chaincodes related to the management of the lifelong learner events.

2. The method of claim 1, further comprising, when the transaction validation succeeds:
   creating a new block and updating the blockchain based on the new block; and
   compiling the transaction associated with the learner's computing device into a chain of the learner's event blocks.

3. The method of claim 2, wherein the events related to a learner include one or more of learner activities, application events, and sensor events.

4. The method of claim 1, wherein the risk assessment is based on the learner's observed behavior, predicted learner characteristics, and context.

5. The method of claim 1, wherein validating the transactions further comprises:
   receiving validity requirements for events on the blockchain;
   obtaining a validation token indicative of a validity of the event related to the learner; and
   computing a chaincode block for each transaction against the validation requirements.

6. The method of claim 1, further comprising automatically changing a rate of updating the blockchain based on the risk assessment.

7. The method of claim 1, further comprising rewarding the learner with a cryptocurrency based on the learner's historical performance, engagement and overall progression, and recording said reward in the blockchain for said learner.

8. A non-transitory program storage device readable by a computer, tangibly embodying a program of instructions executed by the computer to perform method steps for managing lifelong learner events on a blockchain, comprising the steps of:
   detecting an event related to a learner using a blockchain-enabled digital learning system;
   determining a risk level of failing a course of the learner by performing a risk assessment;

determining parameters based on risk level;

determining the values of the parameters from the event related to the learner and metadata and documents associated with the event related to the learner, wherein the values of the parameters include pause, start, stop, fast forward, rewind, zoom-in, zoom-out, click, or hover;

generating a list of transactions related to the event related to the learner and corresponding to the parameters; and validating each transaction in the list of transactions using validating distributed peer-to-peer devices that run one or more chaincodes related to the management of the lifelong learner events.

9. The computer readable program storage device of claim 8, the method further comprising, when the transaction validation succeeds:

creating a new block and updating the blockchain based on the new block; and compiling the transaction associated with the learner's computing device into a chain of the learner's event blocks.

10. The computer readable program storage device of claim 9, wherein the events related to a learner include one or more of learner activities, application events, and sensor events.

11. The computer readable program storage device of claim 8, wherein the risk assessment is based on the learner's observed behavior, predicted learner characteristics, and context.

12. The computer readable program storage device of claim 8, wherein validating the transactions further comprises:

receiving validity requirements for events on the blockchain;

obtaining a validation token indicative of a validity of the event related to the learner; and computing a chaincode block for each transaction against the validation requirements.

13. The computer readable program storage device of claim 8, the method further comprising automatically changing a rate of updating the blockchain based on the risk assessment.

14. The computer readable program storage device of claim 8, the method further comprising rewarding the learner with a cryptocurrency based on the learner's historical performance, engagement and overall progression, and recording said reward in the blockchain for said learner.

* * * * *